US012637284B2

(12) United States Patent
Lee et al.

(10) Patent No.: US 12,637,284 B2
(45) Date of Patent: May 26, 2026

(54) SMART HIGH-TEMPERATURE AGING SYSTEM

(71) Applicant: LG ENERGY SOLUTION, LTD., Seoul (KR)

(72) Inventors: Yong Gu Lee, Daejeon (KR); Sung Kwan Doh, Daejeon (KR); Hyun Cheol Kwon, Daejeon (KR); Heon Ho Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 505 days.

(21) Appl. No.: 18/038,115

(22) PCT Filed: Jul. 5, 2022

(86) PCT No.: PCT/KR2022/009697
§ 371 (c)(1),
(2) Date: May 22, 2023

(87) PCT Pub. No.: WO2023/282596
PCT Pub. Date: Jan. 12, 2023

(65) Prior Publication Data
US 2023/0406619 A1      Dec. 21, 2023

(30) Foreign Application Priority Data
Jul. 6, 2021    (KR) ........................ 10-2021-0088257

(51) Int. Cl.
*B65G 1/04* (2006.01)
*B65D 25/10* (2006.01)
*H01M 10/04* (2006.01)

(52) U.S. Cl.
CPC .......... *B65G 1/0407* (2013.01); *B65D 25/10* (2013.01); *H01M 10/0404* (2013.01); *H01M 10/049* (2013.01)

(58) Field of Classification Search
CPC . B65G 1/0407; B65D 25/10; H01M 10/0404; H01M 10/0409; H01M 10/052;
(Continued)

(56) References Cited

U.S. PATENT DOCUMENTS

| | | | | |
|---|---|---|---|---|
| 11,507,033 B2 * | 11/2022 | Turney | ................... | G06F 30/20 |
| 2010/0330404 A1 * | 12/2010 | Nishino | .............. | H01M 50/213 |
| | | | | 429/82 |
| 2016/0167881 A1 | 6/2016 | Lee et al. | | |

FOREIGN PATENT DOCUMENTS

| | | |
|---|---|---|
| CN | 101952992 A | 1/2011 |
| CN | 102364353 A | 2/2012 |

(Continued)

OTHER PUBLICATIONS

JP 2013-178903 machine English translation (Year: 2013).*
(Continued)

*Primary Examiner* — Michael L Dignan
(74) *Attorney, Agent, or Firm* — Birch, Stewart, Kolasch & Birch, LLP

(57) ABSTRACT

A high temperature aging system includes a battery cell tray stack having a structure in which battery cell trays are stacked in multiple stages therein, one or more tray racks located inside a high temperature aging chamber and each including a grid-shaped storage space in which the battery cell tray stack is located, a stacker crane configured to transport the battery cell tray to the grid-shaped storage space, a thermal imaging camera installed on the stacker crane configured to acquire thermal image temperature data on the battery cell trays loaded in the grid-shaped storage space, and a controller configured to control a temperature inside the high temperature aging chamber on the basis of the thermal image temperature data.

15 Claims, 8 Drawing Sheets

(58) Field of Classification Search
CPC .... H01M 10/446; H01M 10/04; G06N 3/044;
G06N 3/08; G06N 3/0464; Y02E 60/10;
Y02P 70/50
See application file for complete search history.

(56) References Cited

FOREIGN PATENT DOCUMENTS

| | | | | |
|----|-----------|---|---------|-----------|
| CN | 207863545 | * | 9/2018  | ............... E04H 5/02 |
| CN | 109271700 | A | 1/2019  | |
| CN | 111572404 | A | 8/2020  | |
| CN | 112826106 | A | 5/2021  | |
| JP | 2002-355657 | A | 12/2002 | |
| JP | 2004-179009 | A | 6/2004  | |
| JP | 2008-41526 | A | 2/2008  | |
| JP | 2009-193691 | A | 8/2009  | |
| JP | 2013-165029 | A | 8/2013  | |
| JP | 2013-178903 | * | 9/2013  | ............ H01M 10/04 |
| JP | 2013-178903 | A | 9/2013  | |
| JP | 2018-26231 | A | 2/2018  | |
| JP | 2020-89020 | A | 6/2020  | |
| JP | 2021-44135 | A | 3/2021  | |
| KR | 10-2010-0123828 | A | 11/2010 | |
| KR | 10-2014-0037987 | A | 3/2014  | |
| KR | 10-2015-0026994 | A | 3/2015  | |
| KR | 10-1706717 | B1 | 3/2017  | |
| KR | 10-2169040 | B1 | 10/2020 | |
| KR | 10-2190551 | B1 | 12/2020 | |
| WO | WO 2012/053056 | A1 | 4/2012  | |

OTHER PUBLICATIONS

CN 207863545 machine English translation (Year: 2018).*
International Search Report (PCT/ISA/210) issued in PCT/KR2022/
009697, dated Nov. 2, 2022.

* cited by examiner

[FIG. 1]
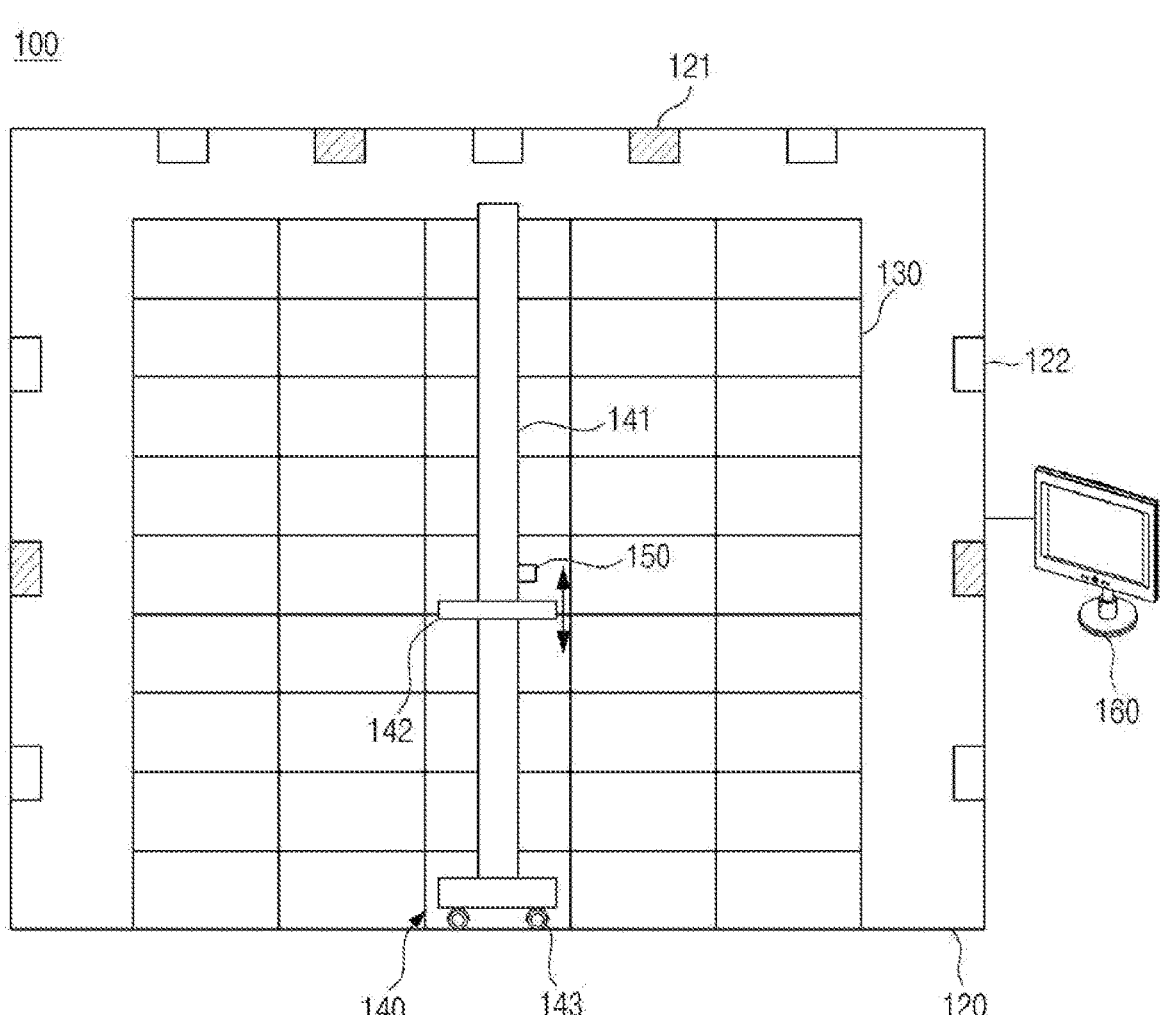

[FIG. 2]
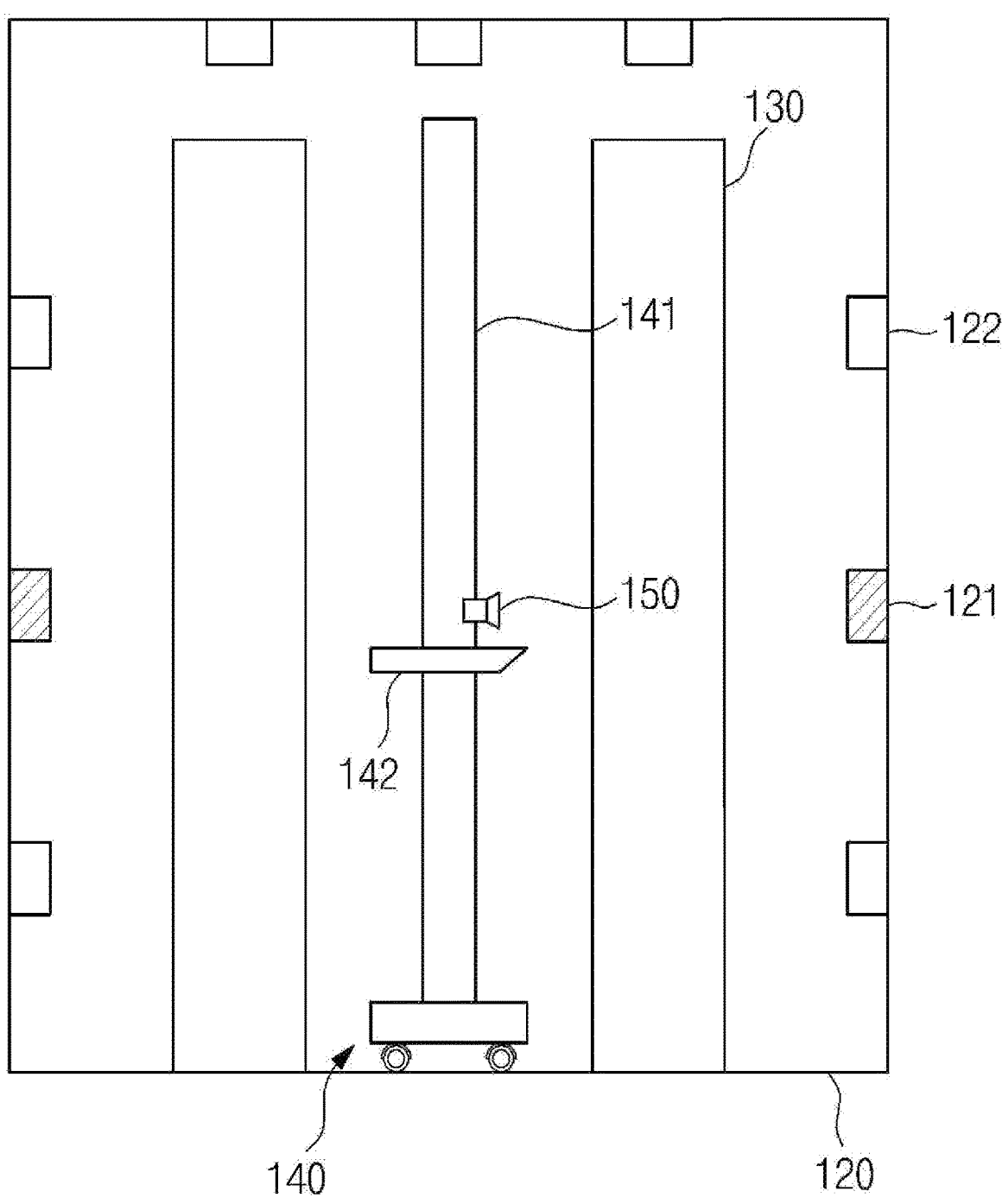

[FIG. 3]
<u>10</u>
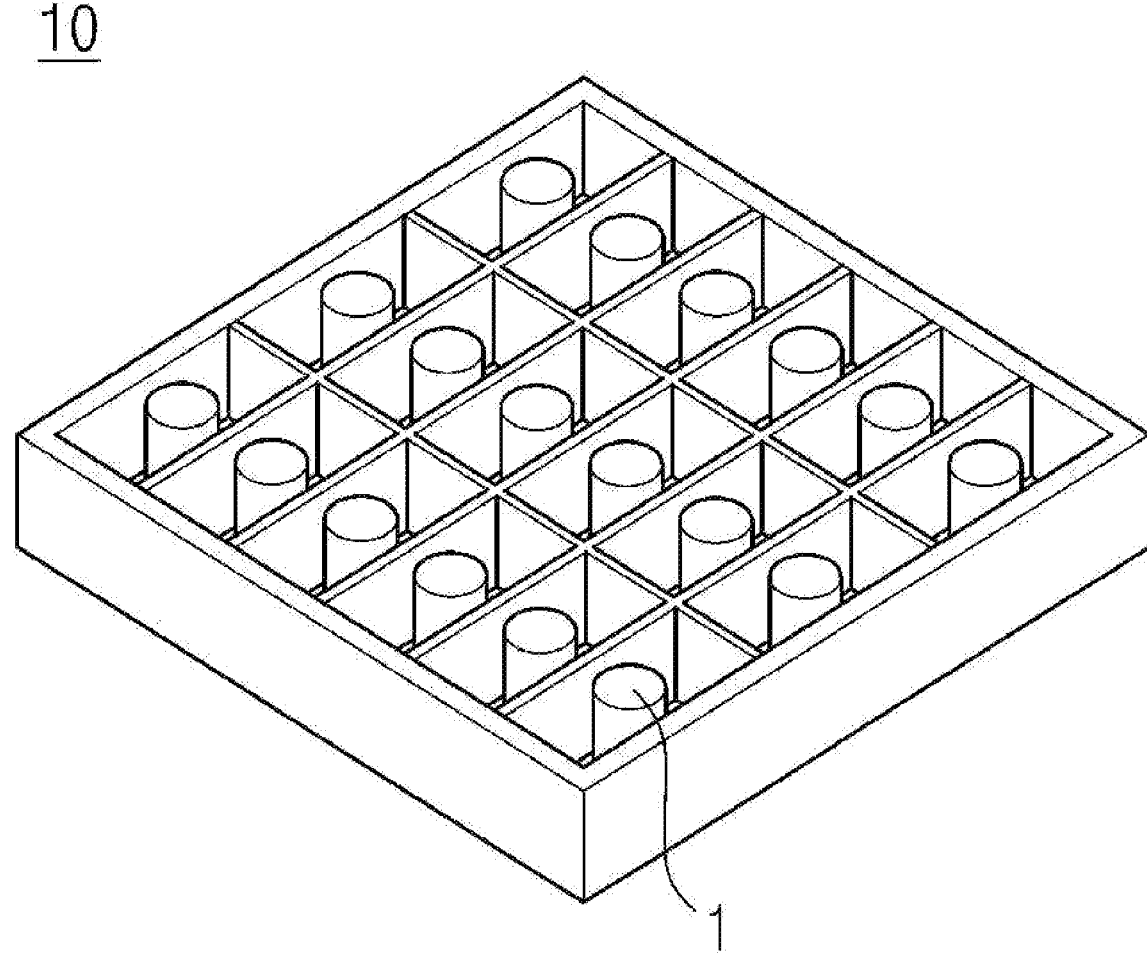
1

[FIG. 4]
110
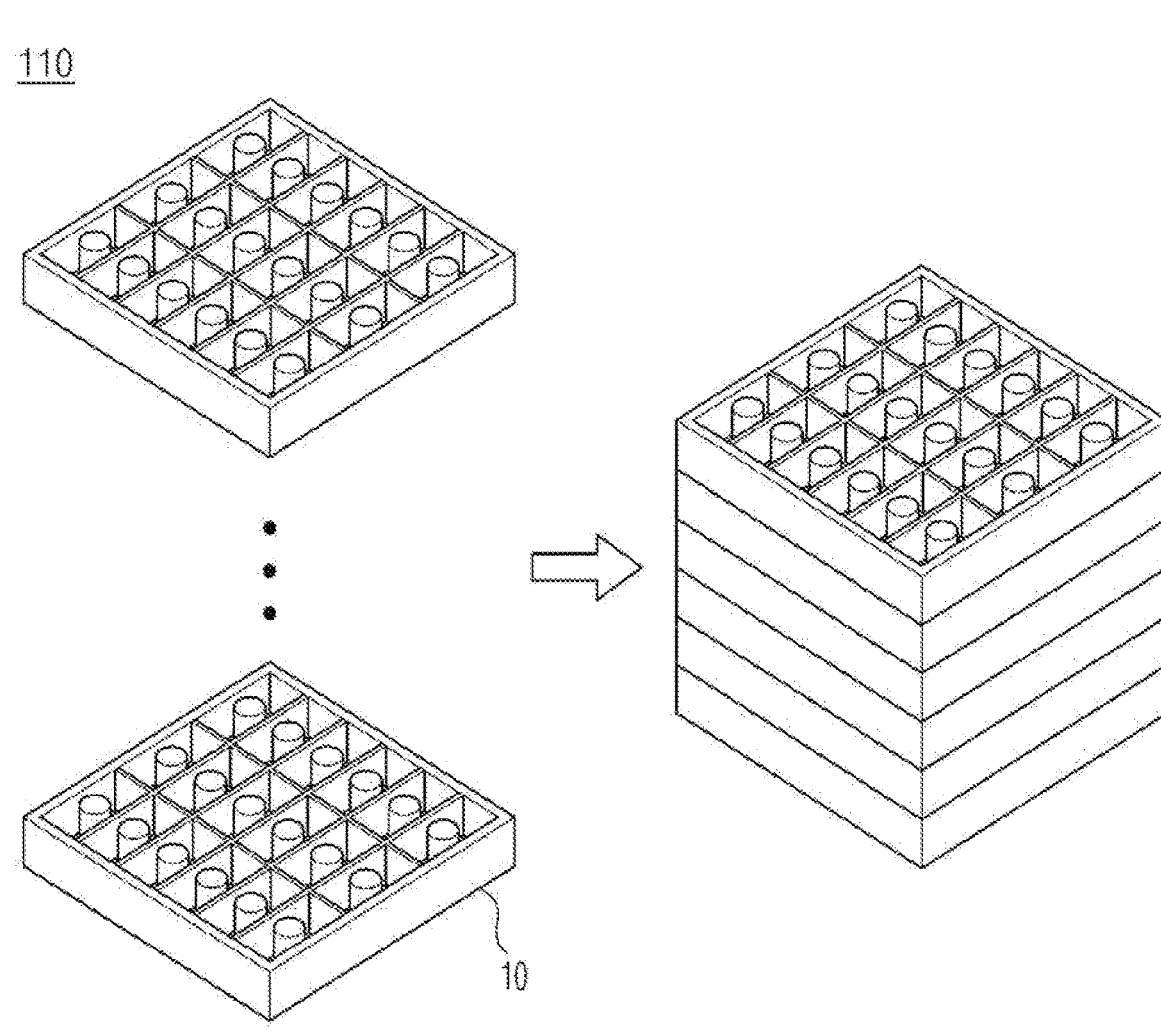

[FIG. 5]
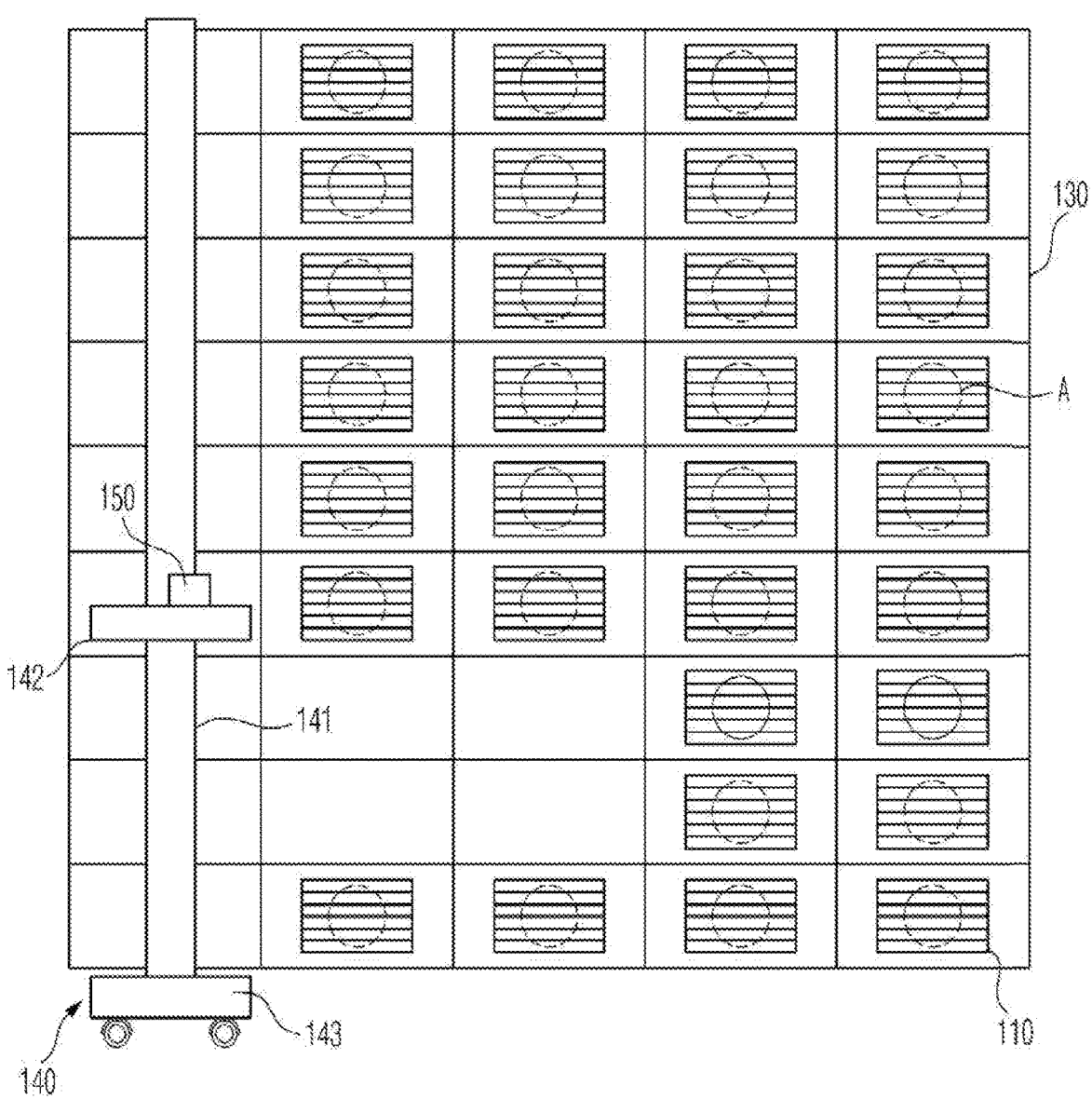

[FIG. 6]
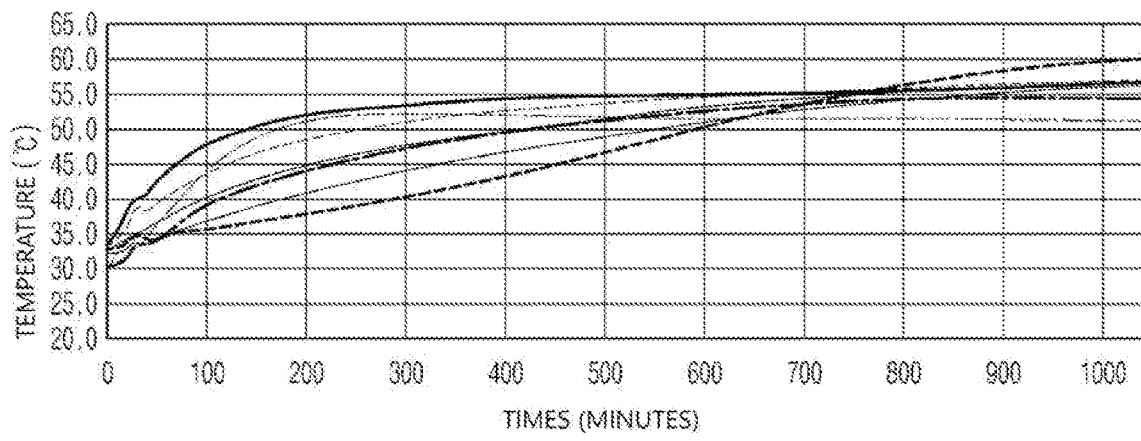

[FIG. 7]
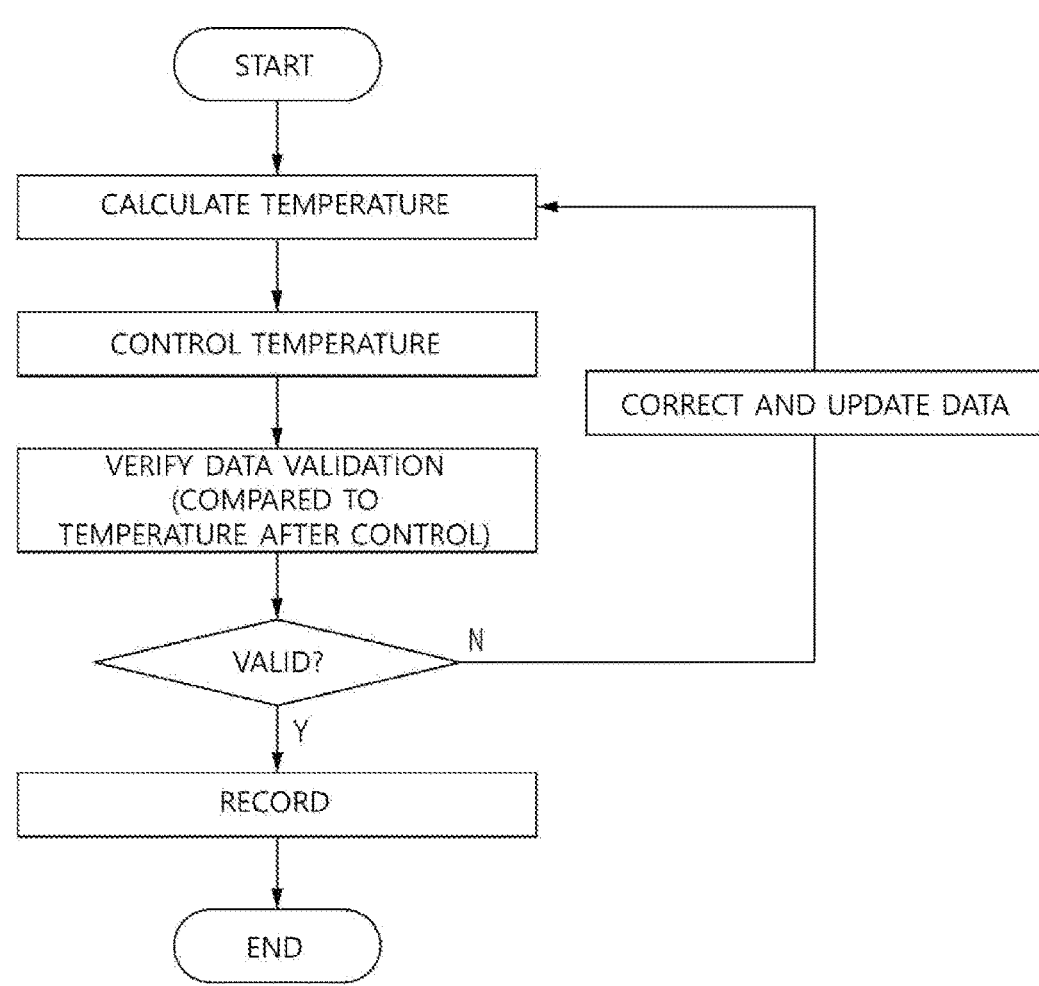

[FIG. 8]
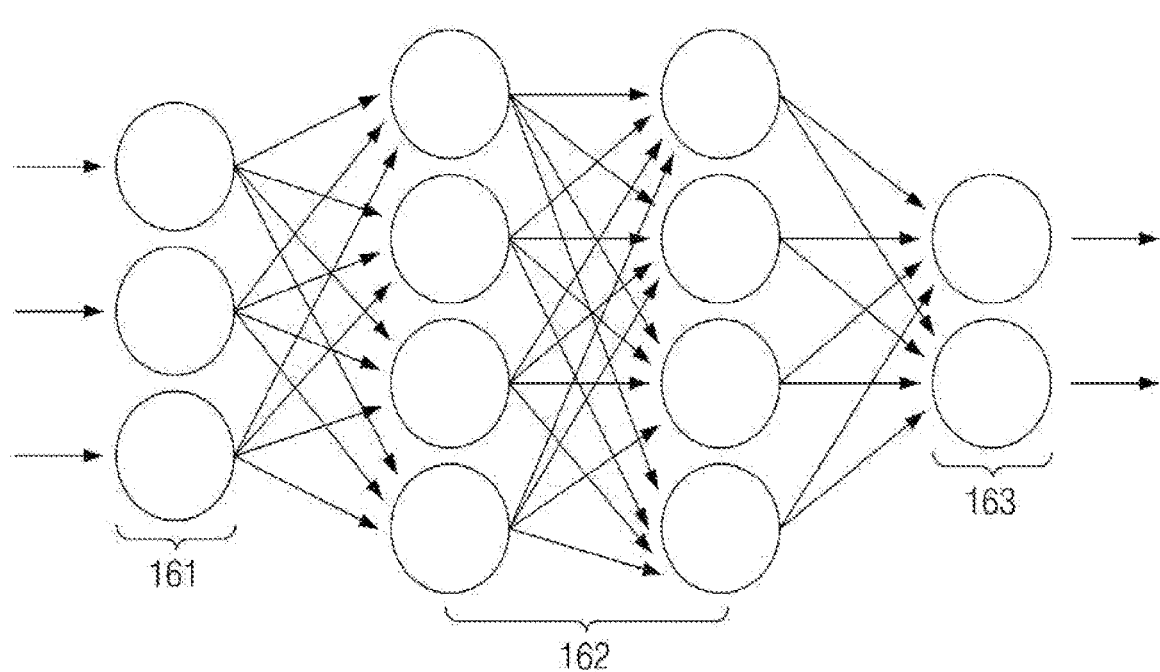

SMART HIGH-TEMPERATURE AGING SYSTEM

TECHNICAL FIELD

The present invention relates to a smart high temperature aging system for a battery cell.

The present application claims the benefit of priority based on Korean Patent Application No. 10-2021-0088257 dated Jul. 6, 2021, and all the entire contents of the Korean patent application are incorporated herein by reference.

BACKGROUND ART

Recently, secondary batteries capable of being charged and discharged have been widely used as energy sources for wireless mobile devices. In addition, the secondary batteries are getting attention as energy sources for electric vehicles and hybrid electric vehicles which are proposed as measures to address the air pollution of conventional gasoline and diesel vehicles using fossil fuels. Therefore, types of applications using the secondary batteries are diversifying due to the advantages of the secondary batteries, and it is expected that the secondary batteries are applied to more fields and products in the future than now.

Secondary batteries may be classified into lithium ion batteries, lithium ion polymer batteries, and lithium polymer batteries according to the composition of an electrode and an electrolyte, and among these batteries, the use of the lithium ion polymer battery, which is less prone to leakage of the electrolyte and easy to manufacture, is increasing. Generally, according to a shape of a battery case, the secondary battery is classified into a cylindrical battery in which an electrode assembly is installed in a cylindrical metal can, a prismatic battery in which an electrode assembly is installed in a prismatic metal can, and a pouch-type battery in which an electrode assembly is installed in a pouch-type case of an aluminum laminated sheet. The electrode assembly installed in the battery case is formed with a structure of a positive electrode, a negative electrode, and a separator interposed between the positive electrode and the negative electrode and is a power generation element capable of being charged and discharged. The electrode assembly is classified into a jelly-roll type electrode assembly in which a separator is interposed between a positive electrode and a negative electrode, which are long sheets coated with an active material, and is wound, and a stack type electrode assembly in which a plurality of positive and negative electrodes, each having a predetermined size, are sequentially stacked with a separator interposed therebetween.

In the secondary battery, an activation process is generally performed after electrolyte injection, and in the activation process, a battery cell forms a solid electrolyte interface (SEI) film through initial charging and then metal foreign materials are rapidly eluted through high-temperature aging to prevent a low voltage failure from being generated.

Since the high-temperature aging is generally performed at a temperature of 60° C. or higher, work should be performed in a space in which the temperature is kept constant. However, according to the related art, after loading trays on which a plurality of battery cells are mounted, temperature control is performed using a general thermometer. However, in this case, among the battery cells in the high temperature aging chamber, a temperature of a battery cell in a central portion of the tray is excessively increased due to difficulty in thermal circulation compared to a battery cell in an outer portion. In this case, a phenomenon in which a capacity of the battery cell located in the central portion is degraded due to an irreversible reaction occurs. In addition, when the temperature control is performed by a person, it is difficult to uniformly control the temperature, and since all the work should be performed manually, there is a problem in that a lot of time and money are required.

RELATED ART DOCUMENT

Patent Document

Korean Patent Laid-Open Application No. 10-2015-0026994

DISCLOSURE

Technical Problem

An object of the present invention is to provide a smart high temperature aging system provided with an algorithm capable of minimizing a temperature deviation inside a tray during a high temperature aging process.

Technical Solution

In one embodiment of the present invention, there is provided a high temperature aging system including a high temperature aging chamber, a battery cell tray stack comprising a plurality of stacked battery cell trays, each battery cell tray including a plurality of battery cells, one or more tray racks located in the high temperature aging chamber, each rack including a grid-shaped storage space in which the battery cell tray stack is located, a stacker crane configured to transport one of the battery cell trays or the battery cell tray stack to the grid-shaped storage space, a thermal imaging camera located on the stacker crane, the thermal camera being configured to acquire thermal image temperature data on the battery cell tray stack loaded in the grid-shaped storage space, and a controller configured to control a temperature inside the high temperature aging chamber on the basis of the thermal image temperature data.

The stacker crane may include a mast configured to move in a left-right direction and a loading station installed on the mast and configured to vertically move, and the thermal imaging camera may be further configured to acquire thermal image temperature data of the battery cell trays while moving together when the mast and the loading station are moved.

One or more heaters and one or more blowing fans may be located in the high temperature aging chamber to control the temperature inside the high temperature aging chamber.

The controller may be further configured to calculate temperatures of a central portion and an outer portion of the battery cell tray stack from the thermal image temperature data and control the temperature inside the high temperature aging chamber on the basis of the calculated temperatures.

When the temperature of the central portion of the battery cell tray stack or a temperature difference between the central portion and the outer portion of the battery cell tray stack is outside a reference range, the controller may be configured to control the temperature inside the high temperature aging chamber.

Each tray rack may include a plurality of battery cell tray stacks. The controller may be configured to calculate an average value of the temperature of the central portion of the battery cell tray stacks located in the tray rack or an average value of the temperature difference between the central portion and the outer portion of the battery cell tray stacks located in the tray rack, and when the calculated average value of the temperature of the central portion of battery cell tray stacks located in the tray rack or the average value of the temperature difference between the central portion and the outer portion of the battery cell tray stacks located in the tray rack is outside a reference range, the controller may be configured to control the temperature of the entire high temperature aging chamber.

The controller may be configured to calculate an average value of the temperature of the central portion of the battery cell tray stacks located in a portion of the tray rack or an average value of the temperature difference between the central portion and the outer portion of the battery cell tray stacks located in the portion of the tray rack, and when the calculated average value of the temperature of the central portion of the battery cell tray stacks located in the portion of the tray rack or an average value of the temperature difference between the central portion and the outer portion of battery cell tray stacks located in the portion of the tray rack is outside a reference range, the controller may be configured to locally control a temperature of a region in which a corresponding battery cell tray stack of the portion of the tray rack is located.

The control of the temperature inside the high temperature aging chamber may be performed by stopping and restarting one or more of the heaters and the blowing fans or by a combination of the stopping and restarting of the one or more of the heaters and the blowing fans.

When decreasing the temperature inside the high temperature aging chamber, the controller may be configured to stop operation of the one or more heaters and operates the one or more blowing fans.

When increasing the temperature inside the high temperature aging chamber, the controller may be configured to operate the one or more heaters and stop the operation of the one or more blowing fans.

The controller may be configured to learn the thermal image temperature data to derive a temperature control algorithm for minimizing a temperature difference between a central portion and an outer portion of the battery cell tray stack.

The controller may be configured to collect the thermal image temperature data to configure training data and the controller may include artificial intelligence configured to derive the temperature control algorithm.

The artificial intelligence may be configured to verify validity of the derived temperature control algorithm by comparing a predicted temperature according to the derived temperature control algorithm and the thermal image temperature data of an actual battery cell tray stack and to update the training data with the verification result.

The temperature control algorithm may relate to positions and numbers of the heaters or the blowing fans operating or stopping or may relate to control of an operating time of one or more of the heaters or the blowing fans.

The artificial intelligence may be formed of a deep neural network (DNN) for deep learning.

Advantageous Effects

In accordance with the present invention, a temperature inside a high temperature aging chamber is optimally controlled on the basis of an artificial intelligence algorithm so that, during a high-temperature aging process, a temperature deviation in the tray can be automatically minimized, and thus it is possible to reduce energy consumption and improve the performance of a battery cell.

BRIEF DESCRIPTION OF THE DRAWINGS

FIGS. 1 and 2 are schematic diagrams illustrating a high temperature aging system according to the present invention.

FIGS. 3 and 4 are schematic diagrams illustrating structures of a battery cell tray and a battery cell tray stack.

FIG. 5 is a schematic diagram illustrating a process in which the battery cell tray stack is accommodated in a tray rack.

FIG. 6 is a graph showing a temperature change of battery cell trays over time in the battery cell tray stack.

FIG. 7 is a flowchart illustrating a temperature control algorithm according to the present invention.

FIG. 8 is a schematic diagram illustrating a structure of a deep neural network (DNN) for deep learning.

DETAILED DESCRIPTION OF THE PREFERRED EMBODIMENTS

Hereinafter, the present invention will be described in detail. Before describing the present invention, terms or words used herein and the appended claims should not be construed to be limited to ordinary or dictionary meanings, and should be construed in accordance with the meaning and concept consistent with the technical spirit of the present invention according to the principle in that inventors can properly define concepts of terms in order to describe their inventions with the best manner.

In the present application, the terms "comprising," "having," and the like are used to specify the presence of a feature, a number, a step, an operation, a component, an element, or a combination thereof described herein, and they do not preclude the presence or addition of one or more other features, numbers, steps, operations, components, elements, or combinations thereof. In addition, when a portion of a layer, a film, a region, a plate, or the like is referred to as being "on" another portion, this includes not only a case in which the portion is "directly on" another portion but also a case in which still another portion is present between the portion and the other portion. Contrarily, when a portion of a layer, a film, a region, a plate, or the like is referred to as being "under" another portion, this includes not only a case in which the portion is "directly under" another portion but also a case in which still another portion is present between the portion and the other portion. In addition, in the present application, being disposed "on" may include the case of being disposed not only on an upper portion but also on a lower portion.

Hereinafter, the present invention will be described in detail.

First Embodiment

FIGS. 1 and 2 are schematic diagrams illustrating a high temperature aging system according to the present invention. FIG. 5 is a schematic diagram illustrating a process in which the battery cell tray stack is accommodated in a tray rack.

Referring to FIGS. 1, 2, and 5, a high temperature aging system 100 according to the present invention includes a battery cell tray stack 110 in which battery cell trays accommodating a plurality of battery cells inside are stacked in multiple stages therein, one or more tray racks 130 accommodated inside a high temperature aging chamber 120 and each including a grid-shaped storage space in which the battery cell tray stack 110 is accommodated, a stacker crane 140 configured to transport the battery cell tray to the grid-shaped storage space, a thermal imaging camera 150 installed on the stacker crane 140 and configured to acquire thermal image temperature data on the battery cell trays loaded in the grid-shaped storage space, and a controller 160 configured to control a temperature inside the high temperature aging chamber on the basis of the thermal image temperature data.

As described above, according to the present invention, the temperature of the high temperature aging chamber is controlled on the basis of the thermal image temperature data, and as will be described below, the temperature control process is performed on the basis of an artificial intelligence algorithm so that energy can be saved and the performance of the battery cell can be improved.

Hereinafter, each configuration of the high temperature aging system will be described in detail.

FIGS. 3 and 4 are schematic diagrams illustrating structures of a battery cell tray and a battery cell tray stack.

In the present invention, a high temperature aging process is performed in the high temperature aging chamber 120 of which the inside is kept constant at a high temperature, and a plurality of battery cells 1 are subjected to the high temperature aging process at one time. To this end, the plurality of battery cells 1 are mounted on the battery cell tray 10 in which the plurality of battery cells 1 may be disposed at regular intervals.

Partition walls may be installed inside the battery cell tray 10 to form grid-shaped storage spaces, and the battery cells 1 may be disposed in the spaces partitioned by the partition walls in a one-to-one manner. In FIG. 3, although the battery cell 1 has been illustrated as a cylindrical battery cell, there is no particular limitation on a shape of the battery cell, and various types of battery cells such as a prismatic battery cell or a pouch-type battery cell may be used. In this case, the shape of the partition wall inside the battery cell tray 10 may be changed according to the shape of the battery cell.

Battery cell trays 10 are stacked in multiple stages as a set for space utilization in the high-temperature aging process to form the battery cell tray stack 110. In FIG. 4, although it is illustrated that six battery cell trays 10 are stacked to form one battery cell tray stack 110, the number of battery cell trays 10 forming the battery cell tray stack 110 is not particularly limited.

Any material may be used as the battery cell tray 10 as long as it cannot be deformed in a high-temperature aging environment. For example, any of metal materials, such as iron and aluminum, and polymer materials such as polycarbonate and acryl may be used.

Referring to FIG. 5 along with FIGS. 1 and 2, one or more tray racks 130 may be provided in the high temperature aging chamber 120 so as to accommodate the battery cell tray stack 110. The tray rack 130 has a structure in which grid-shaped storage spaces are formed like a bookshelf to accommodate the battery cell tray stack 110. The grid-shaped storage spaces are formed in a predetermined number of rows and stages, and in FIGS. 1 and 5, although the grid-type storage spaces have been illustrated as being formed in nine rows×five stages, there is no particular limitation on the sizes and numbers of the grid-type storage spaces.

The battery cell tray stack 110 is transported to the grid-shaped storage space of the tray rack 130 and then stored at a high temperature for a predetermined time. The stacker crane 140 transports the battery cell tray 10 to the grid-shaped storage space. In this case, the battery cell tray 10 may be transported in the form of an individual battery cell tray or may be stacked in the form of the battery cell tray stack 110 and then transported to the storage space at one time.

In the present invention, the stacker crane 140 includes a mast 141 moving in a left-right direction and a loading station 142 installed on the mast 141 to vertically move. The stacker crane 140 includes a traveling cart 143 configured to move in the left-right direction along one side of the tray rack at a bottom of the high temperature aging chamber 120. The traveling cart 143 includes wheels in rolling contact with a floor surface. In this case, in order to allow the traveling cart 143 to move in a state of maintaining a constant distance between the tray rack 130 and the stacker crane 140, a guide rail (not shown) may be formed in a movement path on which the traveling cart 143 is moved.

The mast 141 is mounted on the traveling cart 143 in the form of an upright column, supports the loading station, and provides a path on which the loading station 142 vertically moves. In addition, a guide groove (not shown) for causing the loading station 142 to vertically move may be formed on the mast 141.

The loading station 142 may have a plate shape and may be a part on which the battery cell tray 10 is mounted during the transport process, and a wheel (not shown) capable of being inserted into a guide groove (not shown) is coupled to a surface coupled to the mast 141 so that the loading station 142 may vertically move on the mast 141 along the guide groove. The loading station 142 may vertically move on the mast 141, and the mast 141 may move along the guide rail by the traveling cart 143 in the left-right direction to load or unload the battery cell tray 10 into or from a desired space.

One or more heaters 121 and one or more blowing fans 122 are installed in the high temperature aging chamber 120 to control a temperature inside the high temperature aging chamber 120. In order to uniformly increase and decrease the temperature of the high temperature aging chamber 120, the heaters 121 or the blowing fans 122 may be disposed in a uniform pattern along a wall surface and a ceiling of the high temperature aging chamber. To this end, as described below, when the temperatures of some of the battery cell tray stacks disposed in the storage space is excessively increased or decreased, the blowing fan 122 or the heater 121 of a corresponding battery cell tray stack is operated so that the temperature inside the high temperature aging chamber may be controlled through heat convection. Although the heater 121 and the blowing fan 122 are illustrated as being alternately disposed in FIGS. 1 and 2, the present invention is not limited thereto, and it is also possible to control the temperature through the blowing fan after placing the heater on one side of the high temperature aging chamber.

Meanwhile, the thermal imaging camera 150 is installed on the stacker crane 140 and acquires thermal image temperature data on the battery cell tray stack 110 loaded in the grid-shaped storage space. Specifically, the thermal imaging camera 150 acquires thermal image temperature data on the battery cell trays while being moved with the mast 141 and the loading station 142 for loading or unloading of the battery cell trays 10. For example, the thermal imaging camera 150 may be provided in the form of being coupled to the loading station 142. In this case, as the mast 141 moves in the left-right direction and the loading station 142 vertically moves, the battery cell tray stack 110 may be smoothly photographed.

Specifically, the thermal imaging camera 150 photographs a surface of the battery cell tray stack 110 and displays a temperature distribution for each region through color. In this way, it is possible to simultaneously measure the temperatures of two or more points of a measurement target. Further, since a consecutive check of a temperature between each point is possible using the thermal imaging camera 150, it is possible to intuitively or qualitatively grasp a temperature distribution of the entire region of the measurement target. For example, a portion having a relatively low temperature may have a darker color than a portion having a high temperature. Alternatively, respective temperatures in the temperature distribution may be expressed in different colors so that a portion having a high temperature may be expressed as red and a portion having a low temperature may be expressed as relatively blue.

According to the present invention, since the thermal imaging camera 150 is used to capture a temperature image of the battery cell tray stack 110, a temperature distribution of the entire measurement target is captured on one screen compared to using a conventional thermometer so that it is possible to measure the temperature of not only one point of the measurement target but also the entire region of the measurement target. As described below, this makes it easier to grasp a temperature difference between the central portion and the outer portion of the battery cell tray stack 110 with one photograph and to easily grasp the temperature of the central portion rather than using a thermometer.

The controller 160 may be a computing device, and when the thermal image temperature data is acquired by the thermal imaging camera, the controller 160 controls the temperature inside the high temperature aging chamber 120 on the basis of the thermal image temperature data.

The controller 160 converts a thermal image into a specific temperature value to acquire thermal image temperature data on the outer portion. A method in which the controller converts an image captured by the thermal imaging camera into a specific temperature value may be performed by a conventional computing device or program.

Then, the controller 160 calculates temperatures of the central portion and the outer portion of the battery cell tray stack from the thermal image temperature data.

As shown in FIG. 5, the battery cell tray stack 110 in which the battery cell trays are stacked in multiple stages is loaded into the grid-shaped storage space in the tray rack 130. In this case, during the high-temperature aging process, thermal circulation is difficult in a central portion A of the battery cell tray stack 110 due to surrounding structures (other battery cell trays) so that a temperature of the central portion A is higher than the outer portion. The controller 160 controls the temperature of the high temperature aging chamber on the basis of the temperature data of the central portion and the outer portion of the battery cell tray stack 110.

The controller 160 controls the temperature of the high temperature aging chamber 120 on the basis of the temperature of the central portion of the battery cell tray stack 110 or a temperature difference between the central portion and the outer portion of the battery cell tray stack 110. Specifically, when the temperature of the central portion of the battery cell tray stack 110 or the temperature difference between the central portion and the outer portion of the battery cell tray stack 110 is outside a reference range, the controller 160 controls the temperature inside the high temperature aging chamber 120. Here, the reference range is a temperature range determined to be an appropriate value and may be an item to be appropriately controlled according to specifications of the battery cell, a size of the battery cell, a size of the storage space, and the temperature of the high temperature aging chamber. For example, when the temperature of the central portion of the battery cell tray stack 110 is higher than the reference range or the temperature difference between the central portion and the outer portion is higher than the reference range, the controller may stop heating the high temperature aging chamber 120 and lower the temperature inside the high temperature aging chamber 120.

In one example, the controller 160 calculates an average value of the temperature of the central portion of all battery cell tray stacks 110 accommodated in the tray rack 130 or an average value of the temperature differences between the central portion and the outer portions of all battery cell tray stacks 110 accommodated in the tray rack 130, and when the calculation result is outside a predetermined range, the controller 160 may control the temperature of the entire high temperature aging chamber 120. In this case, the controller 160 determines whether to control the temperature on the basis of all battery cells in the tray rack 130.

In another example, the controller 160 calculates an average value of the temperature of a central portion of battery cell tray stacks 110 accommodated in the tray rack 130 or an average value of temperature differences between the central portion and outer portions of part battery cell tray stacks 110 accommodated in the tray rack 130, and when the calculated result is outside a reference range, the controller 160 locally controls a temperature of a region in which a corresponding battery cell tray stack 110 is located. For example, the controller 160 calculates a temperature of a central portion of the battery cell tray stack 110 located in any one among rows or columns of the tray rack 130 or calculates an average value for temperature differences between the central portion and outer portions of the battery cell tray stack 110, and when the calculated result is outside the reference range, the controller 160 locally controls a temperature of a region in which a corresponding battery cell tray stack 110 is located. Alternatively, when a region with a higher temperature than other regions occurs in some regions of the tray rack 130, a temperature of the corresponding region may be locally controlled.

The control of the temperature inside the high temperature aging chamber 120 may be performed by stopping and restarting one or more of the heaters 121 and the blowing fans 122 or by a combination of the stopping and restarting. Since the heaters 121 or the blowing fans 122 are arranged in a predetermined pattern along the wall and the ceiling of the high temperature aging chamber 120, by operating or not operating all or some of the heaters 121 and the blowing fans 122 which are installed in the high temperature aging chamber 120, a temperature of a target region may be controlled.

Specifically, when decreasing the temperature inside the high temperature aging chamber 120, the controller 160 stops the operation of the heater 121 and operates the blowing fan 122. In addition, when increasing the temperature inside the high temperature aging chamber 120, the controller 160 operates the heater 121 and stops the operation of the blowing fan 122. For example, when the temperature of the central portion is excessively increased and thus the temperature inside the high temperature aging chamber 120 is decreased, when the operation of the heater 121 is stopped, heat is emitted from the central portion of the battery cell tray stack 110 to the outer portion thereof, and thus the temperature of the outer portion may be maintained at a high temperature.

FIG. 6 is a graph showing a temperature change of battery cell trays over time in the battery cell tray stack.

In FIG. 6, a graph shows changes in temperatures measured at various points of the battery cell tray stack constituting the battery cell tray stack 110. Referring to FIG. 6, when about 200 minutes have elapsed from the start of heating, the maximum temperature of a battery cell tray (a battery cell tray located in the central portion) among the battery cell trays is about 53° C., and the minimum temperature of a battery cell tray (a battery cell tray located in the outer portion) is about 35° C. so that it can be seen that a temperature difference is 18° C. In this case, as in the present invention, it can be seen that the temperature inside the high temperature aging chamber is controlled using the blowing fan and the heater so that the temperature difference is gradually reduced.

Second Embodiment

FIG. 7 is a flowchart illustrating a temperature control algorithm according to the present invention.

In another example, the controller 160 may learn the thermal image temperature data to derive a temperature control algorithm for minimizing the temperature difference between the central portion and the outer portion of the battery cell tray stack 110. In this way, the controller 160 automatically controls a temperature by the operation method as described in the first embodiment to minimize the temperature difference between the central portion and the outer portion through the above algorithm so that less time and money are consumed compared to controlling a temperature by a person, and the temperature difference can be precisely controlled.

Specifically, the controller 160 may further include artificial intelligence for temperature control. The artificial intelligence collects thermal image temperature data to configure training data and derives a temperature control algorithm for minimizing a temperature difference between the central portion and the outer portion of the battery cell tray stack 110 from the training data. In addition, the artificial intelligence controls the temperature inside the high temperature aging chamber 120 according to the temperature control algorithm in the same manner as in the first embodiment. That is, the artificial intelligence learns the temperature control algorithm through machine learning or deep learning.

To this end, the high temperature aging system 100 according to the present invention stores thermal image temperature data obtained by performing temperature measurement multiple times. The thermal image temperature data may be stored in a classified state according to a measurement time, an initial temperature condition, and specifications of a battery cell, a battery cell tray, a tray rack, and the like and a database (DB) for storing and managing the data may be provided in a separate storage device. The DB may be utilized as basic data for configuring the training data.

Specifically, the controller 160 may collect the stored thermal image temperature data to configure training data and may include artificial intelligence deriving a temperature control algorithm for minimizing a temperature difference between the central portion and the outer portion of the battery cell tray stack 110 from the training data. The artificial intelligence may configure training data by updating a pre-stored DB with a newly measured result.

Then, the artificial intelligence derives a temperature control algorithm for minimizing the temperature difference between the central portion and the outer portion of the battery cell tray stack 110 from the training data. The temperature control algorithm may relate to positions and numbers of the heaters or the blowing fans operating or stopping or may relate to control of the operating time of the heater or the blowing fan. The artificial intelligence derives the temperature control algorithm according to data on the position, number, and temperature of the battery cell tray stack of which a temperature is to be controlled.

When the temperature control algorithm is derived, the artificial intelligence controls the temperature according to the temperature control algorithm and verifies the validity of the temperature control algorithm. The verification process may be performed by comparing a predicted temperature according to the derived temperature control algorithm with the actual thermal image temperature data of the battery cell tray stack 110. For example, after the temperature is controlled according to the derived temperature control algorithm, when the temperature difference between the central portion and the outer portion of the battery cell tray stack 110 deviates from the predicted result, or when there is no significant difference in effect compared to the temperature data according to the existing conditions, the stored training data is corrected and updated. In this case, in consideration of the experimental condition input together with the stored data, it is possible to analyze the cause of an invalid algorithm. As described above, according to the present invention, the temperature control algorithm is machine learned by the artificial intelligence so that the temperature can be precisely and efficiently controlled.

Third Embodiment

FIG. 8 is a schematic diagram illustrating a structure of a deep neural network (DNN) for deep learning.

Referring to FIG. 8, the controller 160 may learn the thermal image temperature data to derive a temperature control algorithm for minimizing the temperature difference between the central portion and the outer portion of the battery cell tray stack 110, and the controller 160 may further include artificial intelligence for temperature control. The artificial intelligence collects thermal image temperature data to configure training data and derives a temperature control algorithm for minimizing a temperature difference between the central portion and the outer portion of the battery cell tray stack 110 from the training data.

In this case, the artificial intelligence may be formed of a DNN for deep learning.

The DNN is one among models of machine learning for classifying input data on the basis of learned data and means a system or network which builds one or more layers in one or more computers and performs determination on the basis of a plurality of pieces of data.

Referring to FIG. 8, the DNN may include an input layer 161, one or more hidden layers 162, and an output layer 163.

The training data is input to the input layer 161, the result values calculated through the hidden layer and the output layer are compared with actual values, and then a weight value is updated in reverse. After all learning is finished, information which needs to be predicted is input so that a result value may be obtained.

The hidden layer 162 may include a convolution layer, a pooling layer, and a fully connected layer. Here, the convolution layer may extract a feature map from an image input to the input layer and perform a convolution operation. The pooling layer may be connected to the convolution layer to perform sub-sampling on the output of the convolution layer. The fully connected layer may be connected to the pooling layer and learns the sub-sampled output of the pooling layer to perform learning according to a category to be output to the output layer 163.

Meanwhile, a connection structure of each layer constituting the DNN may be formed by appropriately selecting a known algorithm, and for example, the connection structure may be formed in a convolutional neural network (CNN) structure or a recurrent neural network (RNN) structure.

The DNN may be implemented in one computer or implemented through a network through which a plurality of computers are connected.

The learning part 160 inputs the updated training data to the input layer 161 on the DNN. The input training data passes through the hidden layer 162 and is output as a final output from the output layer 163. The learning part may update a weight value according to a validation result of a prediction result to learn newly updated training data.

When the learning of the data is completed, the controller newly derives a temperature control algorithm from the learned data and applies the temperature control algorithm to control the temperature inside the high temperature aging chamber. Thereafter, the validity of the algorithm is verified through the temperature control result, and a process of reflecting the temperature control result is automatically repeated so that the temperature of the high temperature aging chamber may be precise controlled.

Although embodiments have been described with reference to a number of illustrative embodiments of the technical spirit of the present invention, it should be understood that numerous other modifications and embodiments can be devised by those skilled in the art that will fall within the spirit and scope of the principles of the present invention. Therefore, the drawings disclosed herein are not to be taken in a sense of limiting the technical concept of the present invention but for explanation thereof, and the range of the technical concept is not limited to these drawings. The scope of the present invention should be construed by the appended claims, along with the full range of equivalents to which such claims are entitled.

Meanwhile, in the present specification, terms indicating upward, downward, leftward, rightward, frontward, and rearward directions are used, and these terms are merely for convenience of description, and it is obvious that these terms may be changed according to a location of an object or an observer.

DESCRIPTION OF REFERENCE NUMERALS

1: battery cell
10: battery cell tray
100: high temperature aging system
110: battery cell tray stack
120: high temperature aging chamber
121: heater
122: blowing fan
130: tray rack
140: stacker crane
141: mast
142: loading station
143: traveling cart
150: thermal imaging camera
160: controller
161: input layer
162: hidden layer
163: output layer

The invention claimed is:

1. A high temperature aging system comprising:
a high temperature aging chamber;
a battery cell tray stack comprising a plurality of stacked battery cell trays, each battery cell tray including a plurality of battery cells;
one or more tray racks located in the high temperature aging chamber, each tray rack including a grid-shaped storage space in which the battery cell tray stack is located;
a stacker crane configured to transport one of the battery cell trays or the battery cell tray stack to the grid-shaped storage space;
a thermal imaging camera located on the stacker crane, the thermal imaging camera being configured to acquire thermal image temperature data on the battery cell tray stack loaded in the grid-shaped storage space; and
a controller configured to control a temperature inside the high temperature aging chamber on the basis of the thermal image temperature data.

2. The high temperature aging system of claim 1, wherein:
the stacker crane includes a mast configured to move in a left-right direction and a loading station installed on the mast and configured to vertically move; and
the thermal imaging camera is further configured to acquire thermal image temperature data of the battery cell trays while moving together with the mast and the loading station when the mast and the loading station are moved.

3. The high temperature aging system of claim 1, wherein one or more heaters and one or more blowing fans are located in the high temperature aging chamber to control the temperature inside the high temperature aging chamber.

4. The high temperature aging system of claim 1, wherein the controller is further configured to:
calculate temperatures of a central portion and an outer portion of the battery cell tray stack from the thermal image temperature data; and
control the temperature inside the high temperature aging chamber on the basis of the calculated temperatures.

5. The high temperature aging system of claim 4, wherein, when the temperature of the central portion of the battery cell tray stack or a temperature difference between the central portion and the outer portion of the battery cell tray stack is outside a reference range, the controller is configured to control the temperature inside the high temperature aging chamber.

6. The high temperature aging system of claim 4, wherein each tray rack comprises a plurality of battery cell tray stacks, and
wherein the controller is configured to:
calculate an average value of the temperature of the central portion of the battery cell tray stacks located in the tray rack or an average value of the temperature difference between the central portion and the outer portion of the battery cell tray stacks located in the tray rack; and
when the calculated average value of the temperature of the central portion of battery cell tray stacks located in the tray rack or the average value of the temperature difference between the central portion and the outer portion of the battery cell tray stacks located in the tray rack is outside a reference range, the controller is configured to control the temperature of the entire high temperature aging chamber.

7. The high temperature aging system of claim 4, wherein each tray rack comprises a plurality of battery cell tray stacks, and wherein the controller is configured to:

calculate an average value of the temperature of the central portion of the battery cell tray stacks located in a portion of the tray rack or an average value of the temperature difference between the central portion and the outer portion of battery cell tray stacks located in the portion of the tray rack; and when the calculated average value of the temperature of the central portion of the battery cell tray stacks located in the portion of the tray rack or an average value of the temperature difference between the central portion and the outer portion of battery cell tray stacks located in the portion of the tray rack is outside the reference range, the controller is configured to locally control a temperature of a region in which a corresponding battery cell tray stack of the portion of the tray rack is located.

8. The high temperature aging system of claim 3, wherein the control of the temperature inside the high temperature aging chamber is performed by stopping and restarting one or more of the heaters and the blowing fans or by a combination of the stopping and restarting the one or more of the heaters and the blowing fans.

9. The high temperature aging system of claim 8, wherein, when decreasing the temperature inside the high temperature aging chamber, the controller is configured to stop operation of the one or more heaters and operates the one or more blowing fans.

10. The high temperature aging system of claim 8, wherein, when increasing the temperature inside the high temperature aging chamber, the controller is configured to operate the one or more heaters and stop operation of the one or more blowing fans.

11. The high temperature aging system of claim 1, wherein the controller is configured to collect the thermal image temperature data to derive a temperature control algorithm for minimizing a temperature difference between a central portion and an outer portion of the battery cell tray stack.

12. The high temperature aging system of claim 11, wherein the controller is configured to collect the thermal image temperature data to configure training data, and wherein the controller includes artificial intelligence configured to derive the temperature control algorithm.

13. The high temperature aging system of claim 12, wherein the artificial intelligence is configured to:

verify validity of the derived temperature control algorithm by comparing a predicted temperature according to the derived temperature control algorithm and the thermal image temperature data of an actual battery cell tray stack; and update the training data with the verification result.

14. The high temperature aging system of claim 11, wherein the temperature control algorithm relates to positions and numbers of the heaters or the blowing fans operating or stopping or to control of an operating time of the one or more heaters or the blowing fans.

15. The high temperature aging system of claim 12, wherein the artificial intelligence is formed of a deep neural network (DNN) for deep learning.

* * * * *